United States Patent [19]

Ohwada et al.

[11] Patent Number: 5,109,088
[45] Date of Patent: Apr. 28, 1992

[54] RESIN COMPOSITION FOR CEMENT

[75] Inventors: Takeo Ohwada, Tagagun; Kazuyuki Tanaka, Hitachi, both of Japan

[73] Assignee: Hitachi Chemical Company Ltd., Tokyo, Japan

[21] Appl. No.: 548,985

[22] PCT Filed: Apr. 7, 1989

[86] PCT No.: PCT/JP89/00374

§ 371 Date: Jul. 30, 1990

§ 102(e) Date: Jul. 30, 1990

[87] PCT Pub. No.: WO90/12045

PCT Pub. Date: Oct. 18, 1990

[51] Int. Cl.$^5$ .............................................. C08F 24/00
[52] U.S. Cl. ...................................... 526/273; 526/281
[58] Field of Search .................................. 526/273, 281

[56] References Cited

FOREIGN PATENT DOCUMENTS 61-012776  1/1986  Japan.
63-055143  3/1988  Japan.
63-249154 10/1988  Japan.
63-297254 12/1988  Japan.
64-005935  1/1989  Japan.
64-028225 11/1989  Japan.

Primary Examiner—Joseph L. Schofer
Assistant Examiner—Alex H. Walker
Attorney, Agent, or Firm—Antonelli, Terry Stout & Kraus

[57] ABSTRACT

A resin composition for cement, which comprises a polymer obtained by the emulsion polymerization of a dicyclopentadiene derivative represented by general formula,

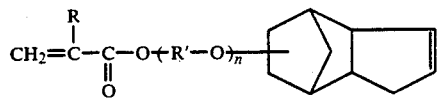

an unsaturated epoxy ester (B), an α,β-unsaturated monocarboxylic acid (C), and an ethylenically unsaturated monomer (D) copolymerizable with the above three components (A), (B), and (C), and use of said composition by blending same into cement.

3 Claims, No Drawings

RESIN COMPOSITION FOR CEMENT

FIELD OF ART

This invention relates to a resin composition for cement and use thereof.

TECHNICAL BACKGROUND

In the fields of civil engineering and construction, an emulsion of a synthetic polymer called an adhesion promoter is thinly coated on a concrete surface as a primer, or blended with cement mortar, etc., in order to improve workability, adhesion, physical strength, contraction, water absorptivity, etc., of cement paste, cement mortar, etc. As a proposal for improvement of adhesion of cement mortar, there is a process which comprises pre-applying a synthetic polymer emulsion to a surface in order to promote the adhesion of mortar, as is disclosed in Japanese Patent Publication No. B-Sho-44-18757.

Even if an emulsion of a synthetic polymer was used on a concrete surface or in cement mortar according to the above prior technique, the general performances of workability, adhesion, alkali resistance, weatherability, etc., are not sufficiently well-balanced. An ethylene-vinyl acetate-based emulsion has good hydrophilic nature and hence has good compatibility with cement and excellent workability. However, it has a defect that the polymer is susceptible to hydrolysis due to alkalinity of cement.

A styrene-butadiene-rubber-based latex has good alkali resistance. However, it has poor hydrophilic nature and hence has poor compatibility with cement. For this reason, its workability is inferior. Further, since it has a double bond derived from butadiene, its weatherability is poor.

On the other hand, an acrylic emulsion has high hydrophilicity, and therefore has good compatibility with cement. Further, it is excellent in alkali resistance and weatherability. However, its difficulty is that since none of its adhesion to a concrete surface, dry contraction and freeze and thaw stabilities are insufficient, the range of its application is naturally limited.

DISCLOSURE OF THE INVENTION

The present inventors have focused on the excellent workability, alkali resistance and weatherability of an acrylic emulsion, and made a diligent study to improve the defects of this emulsion, dry contraction and adhesion. As a result, they have found that the above defects can be overcome by using a polymer obtained by graft-copolymerization of a dicyclopentadiene derivative, an unsaturated epoxy ester, an α,β-unsaturated monocarboxylic acid and an ethylenically unsaturated monomer according to an emulsion polymerization method, which finding has led to this invention.

BEST MODE FOR CARRYING OUT THIS INVENTION

That is, this invention relates to a resin composition for cement, which comprises a polymer obtained by the emulsion polymerization of 5 to 50% by weight of a dicyclopentadiene derivative (A) represented by the following general formula

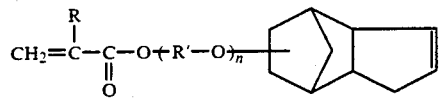

(wherein R represents hydrogen or a methyl group, R' represents a divalent organic group, and n represents 0 or a positive integer), 1 to 50% by weight of an unsaturated epoxy ester (B), 0.5 to 5% by weight of an α,β-unsaturated monocarboxylic acid (C), and 30 to 90% by weight of an ethylenically unsaturated monomer (D) copolymerizable with the components (A), (B) and (C) the above components being selected so that their total weight is 100% by weight.

Examples of the dicyclopentadiene derivative represented by the above general formula include dicyclopentadienyloxyalkyl acrylates or their corresponding methacrylates such as dicyclopentadienyl (meth)acrylate, dicyclopentadienyloxyethyl (meth)acrylate, dicyclopentadienyloxybutyl (meth)acrylate, dicyclopentadienyloxypropyl (meth)acrylate, etc., dicyclopentadienyloxyethoxyethyl (meth)acrylate, and the like. Among these, preferably usable are dicyclopentadiene derivatives of the above general formula wherein n is 1 to 2.

The dicyclopentadiene derivative represented by the above general formula is an already known compound, and can be produced by a process described in Japanese Patent Publication No. B-Sho-61-43337.

For example, the compound can be produced by reacting alkylene glycol or oxyalkylene glycol with dicyclopentadiene in the presence of an acid catalyst and then reacting acrylic acid or methacrylic acid with the reaction product.

The amount of the compound of the above general formula for use is in the range of 5 to 50% by weight based on the total weight of the components (A), (B), (C) and (D). When the amount is less than 5% by weight, the resultant crosslinked structure is not sufficient and its contraction is insufficient. When the amount exceeds 50% by weight, the resultant product has too high a crosslink density and a low flexibility, and it cannot withstand a high and low temperature cycle.

The component (B), unsaturated epoxy ester, can be obtained by reacting monoepoxide or polyepoxide with α,β-unsaturated monocarboxylic acid.

The monoepoxide or polyepoxide stands for that which has at least one epoxy group per molecule Examples of the monoepoxide are monoglycidyl ester of fatty acid, etc., and examples of the polyepoxide are glycidyl polyether of polyhydric alcohol or polyhydric phenol, epoxidized fatty acid or drying oil acid, epoxidized diolefin, ester of epoxidized di-unsaturated acid, epoxidized saturated polyester, etc.

In particular, a mono- or polyepoxide having an epoxy equivalent of not more than 1,000 is preferable, and when the epoxy equivalent exceeds 1,000, unsaturated epoxy ester obtained by a reaction of a mono- or polyepoxide with α,β-unsaturated monocarboxylic acid tends to be insoluble in the other copolymerizable unsaturated monomers.

Examples of the α,β-unsaturated monocarboxylic acid are methacrylic acid, acrylic acid, crotonic acid, etc., and these may be used in combination. The unsaturated epoxy ester is an aduct of the epoxy group of monoepoxide or polyepoxide with the carboxyl group of α,β-unsaturated monocarboxylic acid, and represented by the following formula (1)

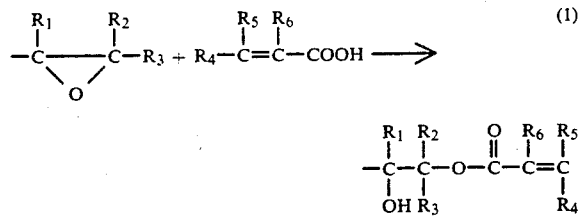

wherein $R_1$, $R_2$, $R_3$, $R_4$, $R_5$ and $R_6$ each represents hydrogen or an alkyl group.

For this reaction, the monoepoxide or polyepoxide and the α,β-unsaturated monocarboxylic acid are mixed such that the epoxy group/carboxyl group equivalent ratio is 4/1 to 1/2, preferably 2/1 to 1/1.

No limitation is imposed on the conditions for the production of the unsaturated epoxy ester, and it is synthesized, for example, by using a catalyst for addition and a polymerization inhibitor, and carrying out the above reaction at 100° to 130° C. for 5 to 10 hours.

Examples of the catalyst for addition include halides such as zinc chloride, lithium chloride, etc., sulfides such as dimethyl sulfide, methylphenyl sulfide, sulfoxides such as dimethyl sulfoxide, methyl sulfoxide, methylethyl sulfoxide, etc., tertiary amines such as N,N-dimethylaniline, pyridine, triethylamine, hexamethylenediamine, etc., hydrochloride or bromate of these tertiary amines, quaternary ammonium salts such as tetramethylammonium chloride, trimethyldodecylbenzylammonium chloride, etc., p-toluene sulfonic acid, mercaptans such as ethyl mercaptan, propyl mercaptan, etc., and the like.

Examples of the polymerization inhibitor include hydroquinone, tert-butyl catechol, p-benzoquinone, 2,5-ditert-butyl hydroquinone, bis(2-hydroxy-3-tert-butyl-5-ethylphenyl)methane, etc.

The amount of the above component (B) for use is 1 to 50% by weight based on the total weight of the components (A), (B), (C) and (D). When the amount is less than 1% by weight, the resultant cement mortar has insufficient adhesion, and when it exceeds 50% by weight, the weatherability is damaged.

Examples of the component (C), α,β-unsaturated carboxylic acid, are acrylic acid, methacrylic acid, crotonic acid, etc., and its amount for use is 0.5 to 5% by weight based on the total weight of the components (A), (B), (C) and (D). When the amount is less than 0.5% by weight, the resulting freeze and thaw stabilities are poor, and when it exceeds 5% by weight, the miscibility of the resultant cement is degraded and further, the hydrolysis reaction of the cement is very slow.

Examples of the component (D) include alkyl acrylates having an alkyl group having 1 to 12 carbon atoms such as methyl acrylate, ethyl acrylate, butyl acrylate, 2-ethylhexyl acrylate, etc., alkyl methacrylates corresponding to these alkyl acrylates, styrene or substituted styrenes such as vinyl toluene, chlorostyrene, α-methylstyrene, etc., unsaturated nitriles such as acrylonitrile, methacrylonitrile, etc., hydroxyalkyl acrylates such as 2-hydroxyethyl acrylate, 2-hydroxypropyl acrylate, 2-hydroxybutyl acrylate, etc., hydroxyalkyl methacrylates corresponding to these hydroxyalkyl acrylates, polymerizable monomers having a hydroxyl group such as N-methylol acrylamide, N-methylolmethacrylamide, alkyl etherified compounds of these, etc., and the like Further, vinyl monomers such as vinyl acetate, vinyl chloride, etc., are usable. In particular, the use of vinyl acetate degrades alkali resistance, and it is therefore preferable that the vinyl acetate is used in combination with other ethylenically unsaturated monomer and in an amount of less than 60% by weight based on the weight of the component (D) such that the features of the component (D) are not lost.

Also usable are unsaturated amides such as acrylamide, methacrylamide, etc., polymerizable monomers having an oxirane group such as glycidyl acrylate, glycidyl methacrylate, etc., and polyfunctional monomers having not less than 2 ethylenic double bonds in their molecule such as divinyl benzene, diallyl phthalate, triallyl isocyanurate, etc. It is preferable that the unsaturated amides and the unsaturated monomers having a hydroxyl group are used in combination with other ethylenically unsaturated monomer and in an amount of not more than 30% by weight based on the total weight of the component (D). The polyfunctional monomers degrade flex property, and it is preferable that they are used in combination with other ethylenically unsaturated monomer and in an amount of not less than 5% by weight based on the total weight of the component (D).

In view of adhesion of the composition to concrete, the amount of the component (D) for use is in the range of 30 to 90% by weight based on the total weight of the components (A), (B), (C) and (D). That is, the components (A), (B), (C) and (D) are used in the above-specified ranges such that the total weight is 100% by weight.

The polymer obtained in this invention is synthesized according to an ordinary process, and as an emulsifier for this synthesis, anionic emulsifier, nonionic emulsifier, or the like is usable. Each of these emulsifiers can be used in combination with other or others.

Examples of the anionic emulsifier include alkyl sulfate, alkylbenzene sulfonate, alkyldiphenyl ether disulfonate, polyoxyethylenealkylphenyl ether sulfate, etc. Examples of the nonionic emulsifier include polyoxyethylenealkyl ether, polyoxyethylenealkylphenyl ether, polyoxyethylene polyoxypropylene block polymer, etc. It is usually preferable to use an anionic emulsifier and a nonionic emulsifier in combination.

The amount of the emulsifier for use in usually 0.2 to 10 parts by weight based on 100 parts by weight of the components (A), (B), (C) and (D) in total. When the amount of the emulsifier is larger, the water resistance is poor and cement mortar includes many foams when kneaded. As a result, the mortar decreases its density and hence, the physical strength of the resultant cement hardened body is poor.

Polymerization initiators are freely selected from polymerization initiators usable for usual emulsion polymerization, and each of these is used alone or in combination with other or others. And ammonium persulfate is preferred. The amount thereof for use is, in general, 0.05 to 1 part by weight based on 100 parts by weight of the components (A), (B), (C) and (D) in total.

Further, a reducing agent, e.g. sodium thiosulfate, protective colloid, e.g. polyvinyl alcohol, a polymerization regulator, e.g. mercaptan, and the like may be used in combination.

No limitation is imposed on the conditions for the production of the emulsion polymer. For example, it

TABLE 1-continued

|  | Example 1 | Example 2 | Example 3 | Comparative Example 1 | Comparative Example 2 |
|---|---|---|---|---|---|
| Emulgen 950 | 1 | 1 | 1 | 1 | 1 |
| Addition 10% ammonium persulfate water solution | 1 | 1 | 1 | 1 | 1 |
| Neutralization 25% ammonium water | 1.5 | 1.5 | 1.5 | 1.5 | 1.5 |
| Properties |  |  |  |  |  |
| non-volatile content (%) | 50.1 | 50.4 | 49.9 | 50.7 | 50.9 |
| pH | 9.0 | 8.9 | 9.0 | 9.2 | 9.1 |

Polymer cement mortars using polymers produced in Examples 1 to 3 and Comparative Examples 1 to 2, and cement mortar using no polymer (Comparative Example 3) were tested under the following conditions. Table 2 shows the results.

Test conditions

In each test, polymer cement mortar prepared by mixing 100 parts by weight of Portland cement (trade name, Chuoh cement, made by Hitachi Cement), 300 parts by weight of Toyoura standard sand, 10 parts by weight, as a solid content, of one of the polymers synthesized in Examples and Comparative Examples and a suitable amount of water, kneading the mixture and adjusting its mortar flow value to 170±2 mm; or cement mortar using no emulsion polymer was tested according to JIS A-6203 (Polymer dispersion for cement blending).

Further, the emulsions were tested for freeze and thaw stabilities by repeating the freezing of the emulsions down to $-15°$ C. and the thawing thereof up to $25°$ C., which is one cycle, until the fluidities of the resins markedly decreased.

TABLE 2

|  | Example | | | Comparative Example | | |
|---|---|---|---|---|---|---|
|  | 1 | 2 | 3 | 1 | 2 | 3 |
| Mortar flow value (mm) | 169 | 168 | 171 | 172 | 170 | 168 |
| Change ratio in length (%) | 0.067 | 0.054 | 0.069 | 0.112 | 0.109 | 0.186 |
| Adhesion strength (kg/cm$^2$) | 27.5 | 26.1 | 29.8 | 16.3 | 17.2 | 2.0 |
| Flexural strength (kg/cm$^2$) | 81.0 | 82.6 | 82.9 | 78.2 | 77.7 | 36.8 |
| Compressive strength (kg/cm$^2$) | 261 | 270 | 266 | 222 | 236 | 165 |
| Water absorption (%) | 6.8 | 6.4 | 7.0 | 9.9 | 9.7 | 14.4 |
| Freeze and thaw stabilities | No decrease even after 5 cycles | No decrease even after 5 cycles | No decrease even after 5 cycles | 2 cycles | 1 cycle | — |

INDUSTRIAL UTILITY

The resin composition of this invention has good freeze and thaw stabilities, and is excellent in dry contraction (change ratio in length) and adhesion when used as a mortar adhesion promoter, and it can be said to be highly generally usable.

What is claimed is:

1. A resin composition for cement, which comprises a polymer obtained by the emulsion polymerization of
   5 to 50% by weight of a dicyclopentadiene derivative (A) represented by the following general formula

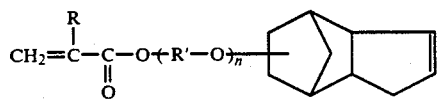

(wherein R represents hydrogen or a methyl group, R' represents a divalent organic group, and n represents 0 or a positive integer),
   1 to 50% by weight of an unsaturated epoxy ester (B),
   0.5 to 5% by weight of an α,β-unsaturated monocarboxylic acid (C), and
   30 to 90% by weight of an ethylenically unsaturated monomer (D) copolymerizable with the components (A), (B) and (C)
   the above components being selected so that their total weight is 100% by weight.

2. A composition according to claim 1 wherein the component (B) has an epoxy equivalent of not more than 1,000.

3. A composition according to claim 1 which is a product of the emulsion polymerization carried out in the presence of 0.05 to 1 part by weight, based on 100 parts by weight of the components (A), (B), (C) and (D) in total, of an emulsifier.

* * * * * may be produced by forming a pre-emulsion from a mixture obtained by dissolving the component (A) in the component (B) together with a mixture of water with an emulsifier by using a mixer, and adding this pre-emulsion to a mixture of water with an emulsifier wholly or partially or continuously to copolymerize it in the presence of a polymerization initiator.

The polymer so obtained may be used directly by blending it with cement without separating it from a reaction solution. In this case, it is preferable to adjust the amounts of the components (A), (B), (C) and (D) as materials such that the concentration of the polymer in the reaction solution when the emulsion polymerization has ended is not less than 30% by weight. If the concentration is less than 30% by weight, the water content is high when it is used in mortar having a large polymer/cement ratio, and undesirably, it is difficult to adjust fluidity at an application time.

Concerning the blending ratio of the resin composition of this invention with cement when it is used, the amount of the above polymer, as solids content, is in the range of from 2 to 40% by weight, preferably from 5 to 30% by weight. When the amount is less than 2% by weight, physical strength, adhesion and workability are not sufficiently exhibited, and when the amount exceeds 40% by weight, the resultant cement hardened body is too flexible, its physical strength is hence poor, surface viscosity is thermally caused and its resistance to contamination is poor. In addition, the amount exceeding 40% by weight is not preferable from an economical point, either.

Examples of cement usable in this invention are known cement such as ordinary Portland cement, early-strength Portland cement, ultrahigh-early-strength Portland cement, blast furnace cement, silica cement, alumina cement, fly ash cement, white Portland cement, etc.

Various additives such as a plasticizer, antifoamer, emulsifier, water reducing agent, thickener, antiseptic, freezing stabilizer, etc., may be incorporated into the resin composition of this invention. Further, the composition of this invention may be used in combination with an epoxy curing agent In this invention, the application of the resin composition to a surface and the blending thereof with cement or cement/aggregate can be carried out according to a usual method.

EXAMPLES

This invention will be explained hereinbelow by reference to Examples and Comparative Examples.

In addition, part stands for part by weight and % for % by weight.

Synthesis Example 250 parts of monoepoxide (tradename Cardular E, manufactured by Shell Chemical, epoxy equivalent 240-250), 86 parts of methacrylic acid, 2 parts of benzyldimethylamine and 0.05 part of hydroquinone were charged into a flask having a reflux condenser, thermometer and stirrer, and reacted at 115° C. to synthesize an unsaturated epoxy ester having a resin acid number of 5.

Example 1

20 parts of dicyclopentadienyloxyethyl acrylate, 20 parts of the unsaturated epoxy ester synthesized in Synthesis Example 1, 1.5 parts of acrylic acid, 24.1 parts of methyl methacrylate and 34.4 parts of 2-ethylhexyl acrylate were mixed, and well stirred to prepare a dissolved mixture 100 parts of this mixture was added to a mixture of 2 parts of polyoxyethylenealkylphenyl ether sodium sulfate (trade name Levenol WZ, manufactured by Kao K.K.), 1 parts of polyoxyethylenenonylphenyl ether (trade name Emulgen 950, manufactured by Kao K.K.) and 48 parts of water in a separate container, and the resultant mixture was emulsified in a homomixer to prepare a pre-emulsion.

Separately, 0.5 part of ammonium persulfate and 50 parts of water were charged into a flask having a reflux condenser, thermometer and stirrer and the flask was subjected to nitrogen substitution. Then, the temperature was elevated to 80° C., and 151 parts of the above pre-emulsion was added dropwise continuously over 3 hours. After the addition of the pre-emulsion, 1 part of a solution of 10% ammonium persulfate in water was added, and the reaction was further continued for 2 hours. Thereafter, the reaction product was cooled to 40° C. and neutralized by adding 1.5 parts of 25% ammonia water to give a polymer.

The resultant polymer had non-volatile content of 50.1% and a pH of 9.0.

Examples 2 to 3 and Comparative Examples 1 to 2

Example 1 was repeated by using material amounts shown in Table 1 to give polymers Table 1 shows properties of the resultant polymers.

TABLE 1

| | | | | (Formulation unit: part by weight) | |
| --- | --- | --- | --- | --- | --- |
| | Example 1 | Example 2 | Example 3 | Comparative Example 1 | Comparative Example 2 |
| Initial charging | | | | | |
| Water | 50 | 50 | 50 | 50 | 50 |
| Ammonium persulfate | 0.5 | 0.5 | 0.5 | 0.5 | 0.5 |
| Preemulsion | | | | | |
| Dicyclopentadienyloxyethyl acrylate | 20 | 25 | 10 | — | — |
| Unsaturated epoxy ester synthesized in Synthesis Example | 20 | 10 | 30 | — | — |
| Acrylic acid | 1.5 | 1.5 | 1.5 | — | — |
| Methyl methacrylate | 24.1 | 29.1 | — | 52.0 | — |
| 2-Ethylhexyl acrylate | 34.4 | 34.4 | — | 48.0 | — |
| Methyl acrylate | — | — | 39.1 | — | 75.0 |
| Butyl acrylate | — | — | 19.4 | — | 25.0 |
| Water | 48 | 48 | 48 | 48 | 48 |
| Emulsifier | | | | | |
| Levenol WZ | 2 | 2 | 2 | 2 | 2 |